(12) United States Patent
Baskey et al.

(10) Patent No.: US 7,490,265 B2
(45) Date of Patent: Feb. 10, 2009

(54) RECOVERY SEGMENT IDENTIFICATION IN A COMPUTING INFRASTRUCTURE

(75) Inventors: Michael E. Baskey, Wappingers Falls, NY (US); Chun-Shi Chang, Poughkeepsie, NY (US); Lap T. Huynh, Cary, NC (US); Dinakaran Joseph, Apex, NC (US); Sambit Sahu, Hopewell Junction, NY (US); Dinesh C. Verma, Mount Kisco, NY (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/382,498

(22) Filed: May 10, 2006

(65) Prior Publication Data

US 2007/0266029 A1    Nov. 15, 2007

(51) Int. Cl.
*G06F 11/00* (2006.01)
(52) U.S. Cl. .......................... 714/15; 714/26
(58) Field of Classification Search ............ 714/15, 714/26
See application file for complete search history.

(56) References Cited

U.S. PATENT DOCUMENTS 5,999,192 A * 12/1999 Selfridge et al. ............ 345/440
2003/0217033 A1 * 11/2003 Sandler et al. ................. 707/1
2004/0216095 A1 * 10/2004 Wu ............................ 717/151

OTHER PUBLICATIONS

White, "A roadmap to enterprise data integration," IBM Information integration solutions, Feb. 2006, pp. 1-31.
Unknown, "On Line Analytical Processing," http://en.wikipedia.org/wiki/Olap, Wikimedia Foundation, Inc., Oct. 13, 2006, pp. 1-5.
Greenfield, "The Data Warehousing Information Center—Maintenance Issues for Data Warehousing Systems," http://www.dwinfocenter.org/maintain.html, LGI Systems Incorporated, 1995-2006, pp. 1-4.
Unknown, "IBM WebSphere Information Integrator Classic Federation and Classic Event Publisher Version 8.2," IBM Corporation, 2005, pp. 1-4.
Schreiber, "Semantic Information Architecture: Solving the Enterprise Data Problem," Unicorn Solutions, Inc., 2003, pp. 1-18.

* cited by examiner

*Primary Examiner*—Scott T. Baderman
*Assistant Examiner*—Jigar Patel
(74) *Attorney, Agent, or Firm*—Raphael Perez-Pineiro; Hoffman Warnick LLC (57) ABSTRACT

A solution for managing a computer infrastructure is provided. In particular, the solution can generate a set of tentative recovery segments for the computer infrastructure based on a related resource graph and a set of partition rules. The related resource graph can be generated based on a managed resource graph, which includes resource type information for each node in the managed resource graph. The set of tentative recovery segments can be used to manage the computer infrastructure and/or a set of recovery segments, which includes recovery characteristic(s) for each segment can be generated based on the set of tentative recovery segments and a set of recovery segment templates. In any event, the invention provides a solution that fully and/or partially automates the identification of recovery segments within a computer infrastructure, thereby enabling a more effective management of the computer infrastructure.

3 Claims, 4 Drawing Sheets

RECOVERY SEGMENT IDENTIFICATION IN A COMPUTING INFRASTRUCTURE

FIELD OF THE INVENTION

The invention relates generally to managing a computer infrastructure, and more particularly, to a solution for identifying recovery segments in the computer infrastructure, which can be subsequently used to implement a recovery process.

BACKGROUND OF THE INVENTION

Many computing infrastructures, such as computing infrastructures implementing on demand business functions, require a high resiliency. In general, resiliency is obtained by detecting a component of a computing infrastructure that has failed or is expected to fail, and restarting another instance of the component. The component can be restarted in the same location in the computing infrastructure or in a different location. However, in a distributed system, there are dependencies among the different components. As a result, merely restarting a single failed component is not sufficient to obtain full fail-over. In particular, other components that are dependent on the failed component also need to be restarted. The collection of all components that need to be restarted together is called a recovery segment.

In order to provide resiliency in operations, recovery segments within the computing infrastructure need to be identified. Subsequently, when recovery is required, the recovery segment can be used to ensure that the recovery is done effectively. For example, a web application may require access to a database in order to generate one or more web pages. If the system needs to be migrated to a different location, the application and the database need to be moved together as a unit. Similarly, in case the database fails, restarting the database server alone will not enable the application to resume since the web application server also needs to be reconfigured to connect to the new instance of the database server. In this case, the application server and the database server together form a recovery segment.

Currently, recovery segments are manually identified. For example, a graph can be generated that includes each managed resource within the computer infrastructure as a node, and a relationship between two resources as a link between the two nodes. An individual may review the graph to manually identify a set of recovery segments for the computer infrastructure. Such manual identification is laborious and error prone.

In view of the foregoing, a need exists to overcome one or more of the deficiencies in the related art.

BRIEF SUMMARY OF THE INVENTION

The invention provides a solution for managing a computer infrastructure. In particular, the solution can generate a set of tentative recovery segments for the computer infrastructure based on a related resource graph and a set of partition rules. The related resource graph can be generated based on a managed resource graph, which includes resource type information for each node in the managed resource graph. The set of tentative recovery segments can be used to manage the computer infrastructure and/or a set of recovery segments, which includes recovery characteristic(s) for each segment can be generated based on the set of tentative recovery segments and a set of recovery segment templates. In any event, the invention provides a solution that fully and/or partially automates the identification of recovery segments within a computer infrastructure, thereby enabling a more effective management of the computer infrastructure.

A first aspect of the invention provides a method of managing a computer infrastructure, the method comprising: obtaining a managed resource graph for the computer infrastructure, the managed resource graph including a set of resources and relationship data for the computer infrastructure, each resource comprising component of the computer infrastructure, the obtaining a managed resource graph including assigning each resource in the set of resources to one of a plurality of resource types, the plurality of resource types consisting of: a starting resource type, a transiting resource type, and a terminating resource type; determining a set of related resources based on the managed resource graph and the corresponding resource types, the determining including: selecting a first resource in the managed resource graph having the starting resource type; and traversing a set of branches in the managed resource graph from the first resource until each branch in the set of branches ends with a resource having the terminating resource type; generating a related resource graph based on the set of related resources, the related resource graph comprising the set of related resources for the computer infrastructure and relationship data for the set of related resources; obtaining a set of partition rules, the set of partition rules defining whether related resources in the related resource graph belong to the same recovery segment; generating a set of tentative recovery segments based on the related resource graph and the set of partition rules; obtaining a set of recovery segment templates, each recovery segment template in the set of recovery segment templates having a corresponding set of recovery characteristics that define requirements for managing the recovery segment template; generating a set of recovery segments based on the set of tentative recovery segments and the set of recovery segment templates, the generating a set of recovery segments including mapping at least one of the set of tentative recovery segments to a corresponding at least one of the set of recovery segment templates, each recovery segment comprising a set of resources in computer infrastructure that operate as an entity; assigning a set of recovery characteristics to each recovery segment in the set of recovery segments based on the set of tentative recovery segments; and storing the set of recovery segments and corresponding set of recovery characteristics for use in managing the computer infrastructure.

A second aspect of the invention provides a system for managing a computer infrastructure, the system comprising: at least one computing device including: a system configured to obtain a managed resource graph for the computer infrastructure, the managed resource graph including a set of resources and relationship data for the computer infrastructure, each resource comprising component of the computer infrastructure, the obtaining a managed resource graph including assigning each resource in the set of resources to one of a plurality of resource types, the plurality of resource types consisting of: a starting resource type, a transiting resource type, and a terminating resource type; a system configured to determine a set of related resources based on the managed resource graph and the corresponding resource types, the system configured to determine including: a system configured to select a first resource in the managed resource graph having the starting resource type; and a system configured to traverse a set of branches in the managed resource graph from the first resource until each branch in the set of branches ends with a resource having the terminating resource type; a system configured to generate a related resource graph based on the set of related resources, the related resource graph comprising the set of related resources for the computer infrastructure and relationship data for the set of related resources; a system configured to obtain a set of partition rules, the set of partition rules defining whether related resources in the related resource graph belong to the same recovery segment; a system configured to generate a set of tentative recovery segments based on the related resource graph and the set of partition rules; a system configured to obtain a set of recovery segment templates, each recovery segment template in the set of recovery segment templates having a corresponding set of recovery characteristics that define requirements for managing the recovery segment template; a system configured to generate a set of recovery segments based on the set of tentative recovery segments and the set of recovery segment templates, the generating a set of recovery segments including mapping at least one of the set of tentative recovery segments to a corresponding at least one of the set of recovery segment templates, each recovery segment comprising a set of resources in computer infrastructure that operate as an entity; a system configured to assign a set of recovery characteristics to each recovery segment in the set of recovery segments based on the set of tentative recovery segments; and a system configured to store the set of recovery segments and corresponding set of recovery characteristics for use in managing the computer infrastructure.

A third aspect of the invention provides a computer program stored on a physical computer-readable storage medium, which when executed, enables a computer system to manage a computer infrastructure, the computer program comprising program code for enabling the computer system to implementing method comprising: obtaining a managed resource graph for the computer infrastructure, the managed resource grpah including a set of resources and relationship data for the computer infrastructure, each resource comorisina comDonent of the comouter infrastructure, the obtaining a managed resource graph including assigning each resource in the set of resources to one of a plurality of resource types, the plurality of resource types consisting of: a starting resource type, a transiting resource type, and a terminating resource type: determining a set of related resources based on the managed resource graph and the corresponding resource types, the determining including: selecting a first resource in the managed resource graph having the starting resource type; and traversing a set of branches in the managed resource graph from the first resource until each branch in the set of branches ends with a resource having the terminating resource type; generating a related resource graph based on the set of related resources, the related resource graph comprising the set of related resources for the computer infrastructure and relationship data for the set of related resources; and obtaining a set of partition rules, the set of partition rules defining whether related resources in the related resource graph belong to the same recovery segment; generating a set of tentative recovery segments based on the related resource graph and the set of partition rules; obtaining a set of recovery segment templates, each recovery segment template in the set of recovery segment templates having a corresponding set of recovery characteristics that define requirements for managing the recovery segment template; generating a set of recovery segments based on the set of tentative recovery segments and the set of recovery segment templates, the generating a set of recovery segments including mapping at least one of the set of tentative recovery segments to a corresponding at least one of the set of recovery segment templates, each recovery segment comprising a set of resources in computer infrastructure that operate as an entity; assigning a set of recovery characteristics to each recovery segment in the set of recovery segments based on the set of tentative recovery segments; and storing the set of recovery segments and corresponding set of recovery characteristics for use in managing the computer infrastructure.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing a computer infrastructure. In particular, the solution can generate a set of tentative recovery segments for the computer infrastructure based on a related resource graph and a set of partition rules. The related resource graph can be generated based on a managed resource graph, which includes resource type information for each node in the managed resource graph. The set of tentative recovery segments can be used to manage the computer infrastructure and/or a set of recovery segments, which includes recovery characteristic(s) for each segment can be generated based on the set of tentative recovery segments and a set of recovery segment templates. In any event, the invention provides a solution that fully and/or partially automates the identification of recovery segments within a computer infrastructure, thereby enabling a more effective management of the computer infrastructure. As used herein, unless otherwise noted, the term "set" means one or more (i.e., at least one) and the phrase "any solution" means any now known or later developed solution.

Figure 1:
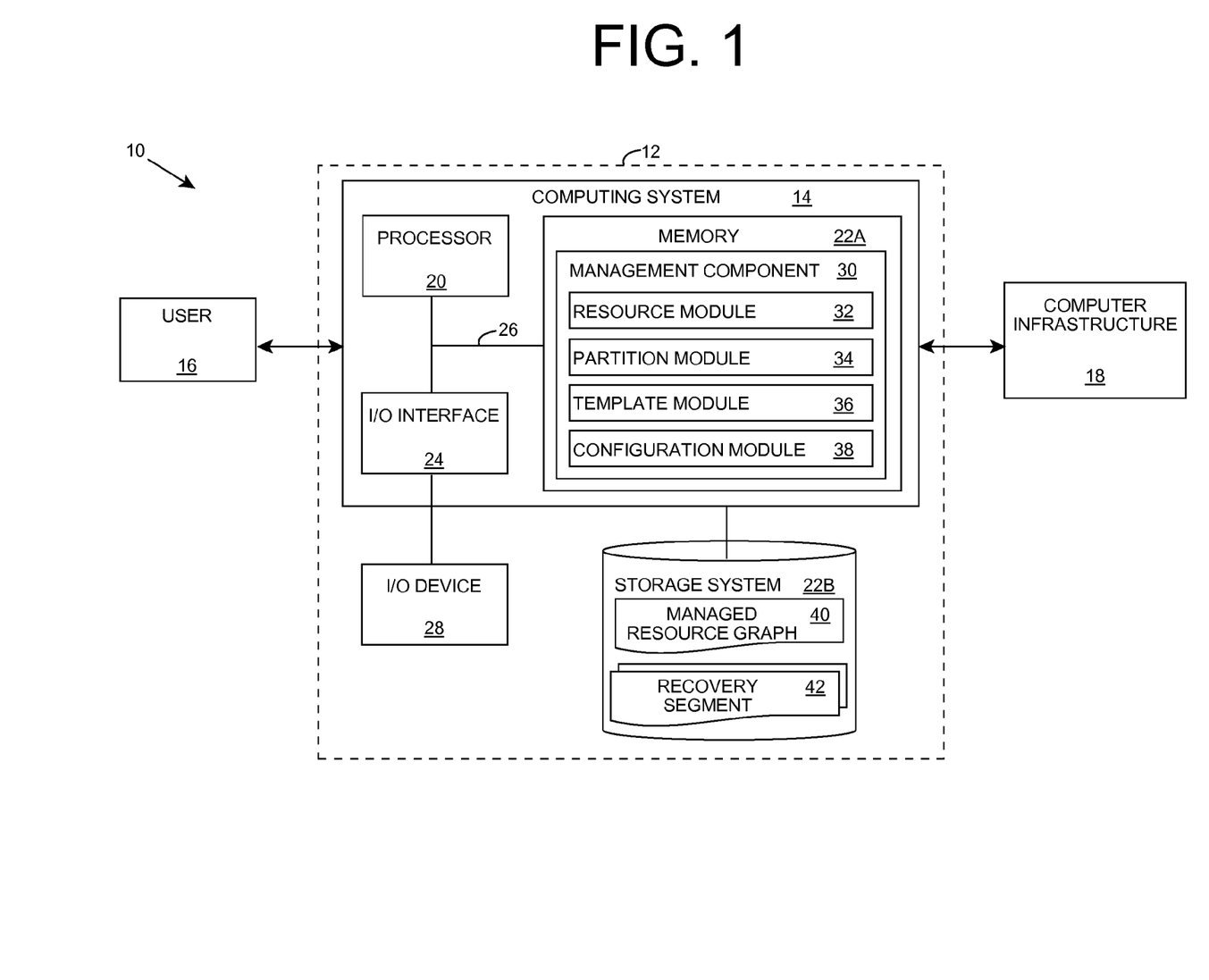
FIG. 1 shows an illustrative environment for managing a computer infrastructure according to an embodiment of the invention.

Turning to the drawings, FIG. 1 shows an illustrative environment 10 for managing a computer infrastructure 18 according to an embodiment of the invention. To this extent, environment 10 includes a computer infrastructure 12 that can perform the process described herein in order to manage computer infrastructure 18. In particular, computer infrastructure 12 is shown including a computing system 14 that comprises a management component 30, which makes computing system 14 operable to manage computer infrastructure 18 by performing the process described herein. While computer infrastructure 12 is shown as being distinct from computer infrastructure 18, it is understood that this is only illustrative. To this extent, some or all of management component 30 and/or computing system 14 could be implemented within the computer infrastructure 18 being managed.

Computing system 14 is shown including a processor 20, a memory 22A, an input/output (I/O) interface 24, and a bus 26. Further, computing system 14 is shown in communication with an external I/O device/resource 28 and a storage system 22B. As is known in the art, in general, processor 20 executes computer program code, such as management component 30, which is stored in memory 22A and/or storage system 22B. While executing computer program code, processor 20 can read and/or write data, such as a managed resource graph 40, to/from memory 22A, storage system 22B, and/or I/O interface 24. Bus 26 provides a communications link between each of the components in computing system 14. I/O device 28 can comprise any device that transfers information between a user 16 and computing system 14. To this extent, I/O device 28 can comprise a user I/O device to enable an individual user 16 to interact with computing system 14 and/or a communications device to enable a system user 16 to communicate with computing system 14 using any type of communications link.

In any event, computing system 14 can comprise any general purpose computing article of manufacture capable of executing computer program code installed thereon (e.g., a personal computer, server, handheld device, etc.). However, it is understood that computing system 14 and management component 30 are only representative of various possible equivalent computing systems that may perform the process described herein. To this extent, in other embodiments, the functionality provided by computing system 14 and management component 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing systems (e.g., a server cluster) that communicate over any type of communications link, such as a network, a shared memory, or the like, to perform the process described herein. Further, while performing the process described herein, one or more computing systems in computer infrastructure 12 can communicate with one or more other computing systems external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, management component 30 enables computer infrastructure 12 to manage computer infrastructure 18. To this extent, management component 30 is shown including a resource module 32, a partition module 34, a template module 36, and a configuration module 38. Operation of each of these modules is discussed further herein. However, it is understood that some of the various modules shown in FIG. 1 can be implemented independently, combined, and/or stored in memory for one or more separate computing systems that are included in computer infrastructure 12. Further, it is understood that some of the modules and/or functionality may not be implemented, or additional modules and/or functionality may be included as part of computer infrastructure 12.

Figure 2:
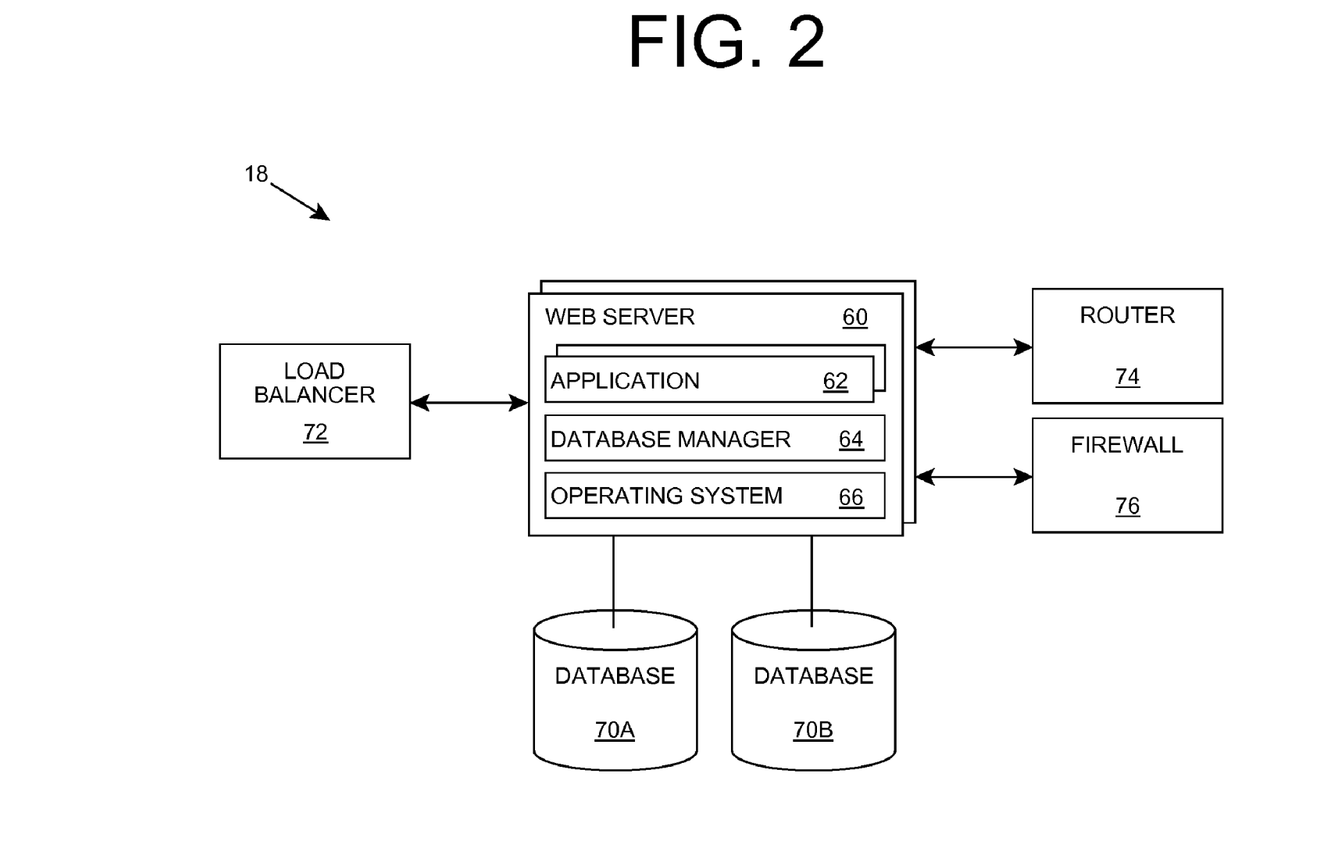
FIG. 2 shows an illustrative computer infrastructure, which can be managed according to an embodiment of the invention.

Regardless, the invention provides a solution for managing computer infrastructure 18. To this extent, FIG. 2 shows an illustrative computer infrastructure 18, which can be managed according to an embodiment of the invention. Computer infrastructure 18 includes one or more web servers 60. Each web server 60 includes an operating system 66 that is executing a set of applications 62. Further, operating system 66 can be executing one or more utility applications, such as a database manager 64, and/or the like. Database manager 64 can enable interaction between application(s) 62 and one or more databases 70A-B. It is understood that web server 60 is only illustrative of various computing systems. For example, web server 60 could comprise a plurality of images, each of which includes an operating system 66 executing a set of applications 62, a database manager 64, and/or the like.

Computer infrastructure 18 can include various other components. For example, computer infrastructure 18 is shown including a load balancer 72, which can distribute data and/or processing requirements between multiple web servers 60. Further, computer infrastructure is shown including a router 74, which can route communications messages within computer infrastructure 18 and/or between computer infrastructure 18 and one or more other computing infrastructures (e.g., computer infrastructure 12 of FIG. 1), and a firewall 76, which can filter message traffic received by computer infrastructure 18. It is understood that the various components shown in computer infrastructure 18 are only illustrative. To this extent, computer infrastructure 18 could include additional components, not include one or more components shown, and/or the like.

The invention provides a solution for identifying recovery segments in computer infrastructure 18. Each recovery segment comprises a set of resources in computer infrastructure 18 that operate as an entity (e.g., unit). In particular, all of the resources in a recovery segment are required to perform some function using computer infrastructure 18. As a result, when management component 30 (FIG. 1) is required to perform some action with respect to computer infrastructure 18, e.g., due to a desired reconfiguration of computer infrastructure 18, a failure that occurred within computer infrastructure 18, and/or the like, management component 30 can make decisions and/or take actions by considering each recovery segment. In this manner, management component 30 can make more informed and effective decisions regarding the action(s) that are desirable with respect to computer infrastructure 18.

In one illustrative embodiment discussed herein, each of the various components of computer infrastructure 18 comprises a resource. To this extent, the resources of computer infrastructure 18 include web server 60, application 62, database manager 64, operating system 66, databases 70A-B, load balancer 72, router 74, and firewall 76. However, it is understood that this is only illustrative. For example, in another embodiment, the set of resources can comprise data items, transactions, and/or the like that are processed by computer infrastructure 18. In this case, a recovery segment can comprise all the related data items required to generate a particular data item, all related transactions required to perform a larger transaction, and/or the like. In particular, a resource can comprise a web page generated by computer infrastructure 18 for presentation to a user and a recovery segment can comprise all the source data items (e.g., portlet(s), database(s), and/or the like) that are required to generate the web page. In other embodiments, a resource can comprise a set of entities corresponding to management objects in conformance with a management standard, such as Distributed Management Task Force, Inc.'s (DMTF's) common information model (CIM) standards, correspond to a unified modeling language (UML) diagram representation of objects in a computing infrastructure, and/or the like.

Figure 3:
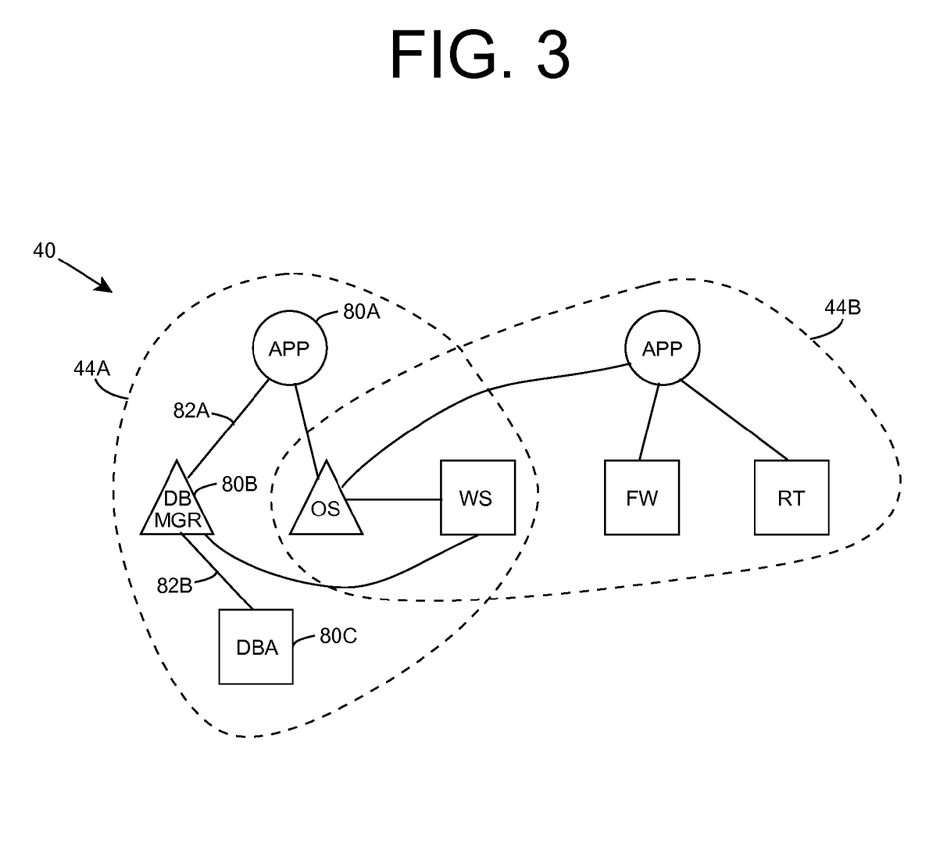
FIG. 3 shows an illustrative managed resource graph according to an embodiment of the invention.

In any event, management component 30 (FIG. 1) can use a managed resource graph 40 (FIG. 1) in order to manage computer infrastructure 18. For example, FIG. 3 shows an illustrative managed resource graph 40 according to an embodiment of the invention. In particular, managed resource graph 40 can be generated from computer infrastructure 18 (FIG. 2). To this extent, managed resource graph 40 includes a node, such as nodes 80A-C for each resource (only some of which are shown for clarity) in computer infrastructure 18. Further, managed resource graph 40 includes relationship data, such as links 82A-B, for the various resources 80A-C in computer infrastructure 18. Data for managed resource graph 40 can be stored using any solution, such as in one or more files in a file system, one or more records in a database, and/or the like.

Resource module 32 (FIG. 1) can obtain managed resource graph 40 using any solution. For example, resource module 32 can receive managed resource graph 40 from a user 16 (FIG. 1). To this extent, resource module 32 can generate a user interface for presentation to an individual user 16, which enables user 16 to select, designate, create, and/or modify managed resource graph 40. Similarly, resource module 32 can define an application program interface (API) or the like that enables a system user 16 to provide managed resource graph 40. Further, resource module 32 can automatically generate/create managed resource graph 40. In this case, resource module 32 can implement a discovery process or the like, which identifies all managed resources within computer infrastructure 18 and the corresponding relationships between the resources.

Each resource 80A-C in managed resource graph 40 can have one of a plurality of resource types. To this extent, resource module 32 (FIG. 1) can obtain a managed resource graph 40 in which each resource 80A-C has one of the plurality of resource types and/or resource module 32 can modify managed resource graph 40 to include the resource type information. In the latter case, resource module 32 can obtain a set of resource type rules using any solution, which match a particular resource with a corresponding resource type. Resource module 32 can use the set of resource type rules to assign each resource 80A-C in managed resource graph 40 to one of the resource types.

Resource module 32 (FIG. 1) can assign the resource types to facilitate the identification of recovery segments. In one embodiment, the plurality of resource types consists of a starting resource type, a transiting resource type, and a terminating resource type. In this case, the starting, transiting, and/or terminating resource types can be assigned to each resource 80A-C based on the types of recovery segments being identified in computer infrastructure 18 (FIG. 2). For example, in order to identify recovery segments based on an application 62 (FIG. 2), each resource that comprises an application (APP) can be assigned a starting resource type, which is shown as a circle in managed resource graph 40. Further, resources that do not require another resource in order to function, such as a web server (WS), a database (DBA), a fire wall (FW), a router (RT), and/or the like, can be assigned a terminating resource type, which is indicated by a square in managed resource graph 40. All other resources, such as a database manager (DB MGR), an operating system (OS), and the like, can be assigned a transiting resource type, which is shown as a triangle in managed resource graph 40.

However, it is understood that this is only an illustrative embodiment, and any solution can be used to assign resource types to each resource 80A-C.

Figure 4:
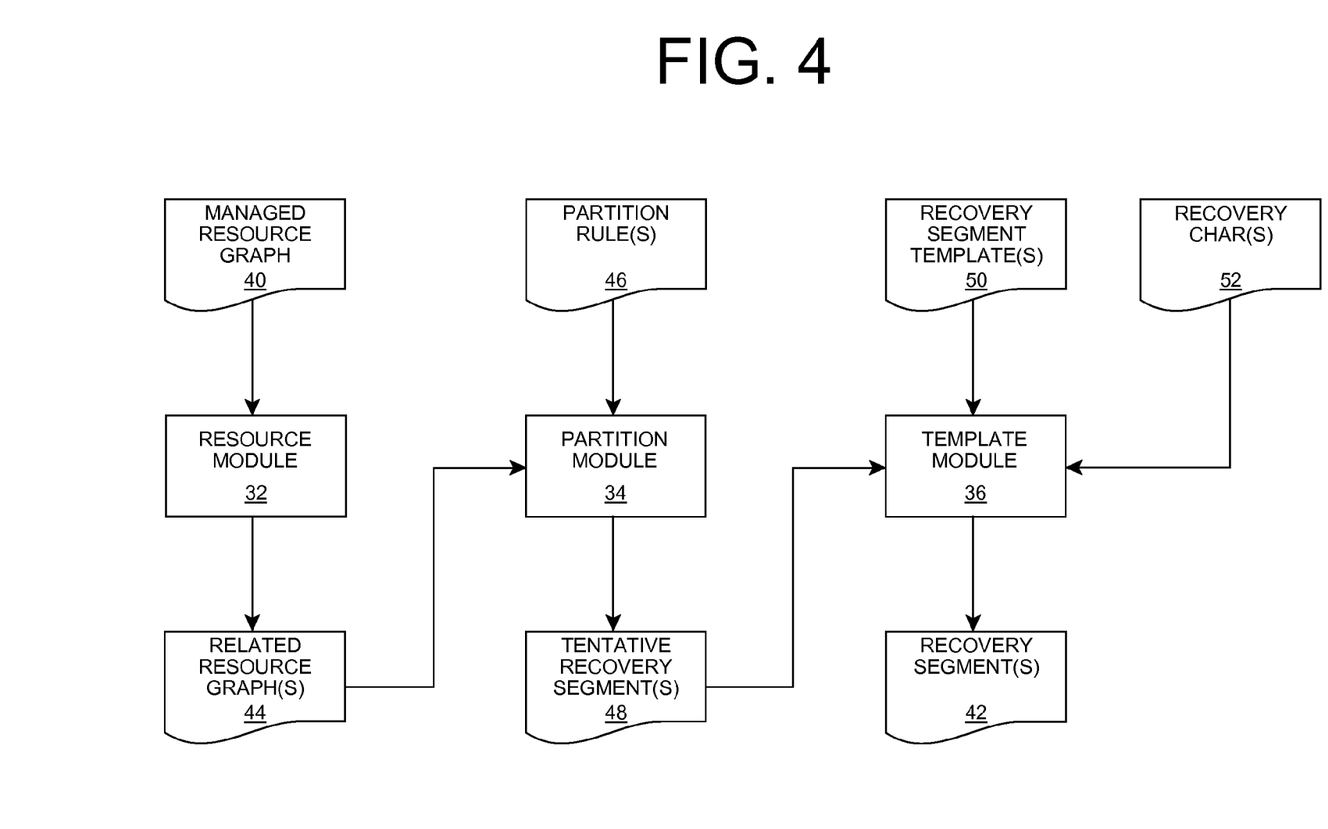
FIG. 4 shows an illustrative data flow diagram for generating a set of recovery segments according to an embodiment of the invention.

In any event, management component 30 (FIG. 1) can use managed resource graph 40 to generate a set of recovery segments 42 (FIG. 1) for computer infrastructure 18 (FIG. 2). To this extent, FIG. 4 shows an illustrative data flow diagram for generating the set of recovery segments 42 according to an embodiment of the invention. As discussed herein, resource module 32 obtains managed resource graph 40, which includes resource type information for each resource included therein. Resource module 32 can generate a set of related resource graphs 44 based on managed resource graph 40. In particular, resource module 32 can determine a set of related resources in managed resource graph 40 based on the relationship data and the corresponding resource types.

Referring to FIGS. 3 and 4, in one embodiment, resource module 32 can select a first resource 80A in managed resource graph 40 having a starting resource type. Resource module 32 can traverse a set of branches (one or more links) in managed resource graph 40 from the first resource 80A until each branch ends with a resource, such as resource 80C, having a terminating resource type. Resource module 32 can use any solution to traverse the set of branches. For example, resource module 32 can use a depth first search (DFS) of managed resource graph 40. The set of nodes and branches traversed can be used as the related resource graph 44. Resource module 32 can repeat the process for each starting resource type in managed resource graph 40 to generate the set of related resource graphs 44. Two illustrative related resource graphs 44A-B, each of which is generated for an application in managed resource graph 40, are shown. While traversing managed resource graph 40, resource module 32 can apply certain rules. For example, resource module 32 can traverse from a node having a starting resource type to a node having a transiting and/or terminating resource type and from a transiting resource type node to a terminating resource type node, but not from a transiting resource type node to a starting resource type node or from a terminating resource type to any other node.

Although two or more resources may be related and therefore included in the same managed resource graph 40, it may be more effective to manage the resources in different recovery segments. To this extent, partition module 34 can generate a set of tentative recovery segment(s) 48 based on the related resource graph(s) 44. In particular, partition module 34 can obtain a set of partition rules 46, which can be used to partition each related resource graph 44 into one or more tentative recovery segments 48. The set of partition rules 46 includes policies/rules that define whether certain nodes that are linked belong to the same or different recovery segments 48.

For example, in related resource graph 44A, it may be more effective to separately manage the database manager, node 80B, and the database, node 80C, separately from the application, node 80A. In this case, a partition rule 46 can designate that nodes 80B-C are included in one tentative recovery segment 48, while the rest of related resource graph 44A is included in another tentative recovery segment 48. It is understood that partition module 34 can further process the remainder of related resource graph 44A, as well as the portion removed from related resource graph 44A, to determine whether either should be further divided into two or more tentative recovery segments 48. Partition module 34 can continue in this manner until each tentative recovery segment 48 has been analyzed using the set of partition rules 48, and no further partitioning is required.

The resulting set of tentative recovery segments 48 can be used when managing computer infrastructure 18 (FIG. 2). However, additional data can be included with each tentative recovery segment 48 in order to assist with the management of computer infrastructure 18. To this extent, template module 36 can obtain a set of recovery segment templates 50 and generate a set of recovery segments 42 based on the set of tentative recovery segments 48. Each recovery segment template 50 can have a corresponding set of recovery characteristics (recovery char(s)) 52. The set of recovery characteristics 52 includes various information on the requirements for managing the corresponding recovery segment template 50. For example, the set of recovery characteristics 52 can comprise a target recovery time, which can be used to prioritize operations during a recovery from one or more failures within computer infrastructure 18. The set of recovery characteristics 52 can include various other types of information, such as performance requirements, bandwidth, memory, processing, and/or the like requirements, a relative priority, etc., which can be used to effectively manage the recovery segment 42.

In any event, template module 36 can compare each tentative recovery segment 48 with the set of recovery segment templates 50. When a match is found, template module 36 can map the tentative recovery segment 48 with the corresponding recovery segment template 50 and assign the set of recovery characteristics 52 that correspond to the matched recovery segment template 50 in order to generate a recovery segment 42. When a tentative recovery segment 48 does not match any of the recovery segment templates 50, template module 36 can generate recovery segment 42 based on the tentative recovery segment 48 and a set of default recovery characteristics 52.

Returning to FIG. 1, configuration module 38 can manage various aspects of computer infrastructure 18 using the set of recovery segments 42. For example, when recovering from one or more failures in computer infrastructure 18 and/or adding functionality to computer infrastructure 18, configuration module 38 can restore/create the set of components in each recovery segment 42 as a consistent and whole unit. Similarly, configuration module 38 can move the components in each recovery segment 42 as a unit. For example, in order to alleviate a processing bottleneck, configuration module 38 can move the components included in a recovery segment 42 from one web server 60 (FIG. 2) to another. In this case, it is understood that one or more components in the recovery segment 42 may not be moved, but a component providing similar/identical functionality may be made available at the new location (e.g., new web server 60).

As discussed herein, various components and modules are described as "obtaining" data (e.g., partition module 34 obtains partition rule(s) 46, template module 36 obtains recovery segment template(s) 50, etc.). It is understood that the corresponding data can be obtained using any solution. For example, the corresponding component/module can generate and/or be used to generate the data, retrieve the data from one or more data stores (e.g., a database), receive the data from another system/component/module, and/or the like. When the data is not generated by the particular component/module, it is understood that another system can be implemented apart from the system shown, which generates the data and provides it to the component/module and/or stores the data for access by the component/module.

While shown and described herein as a method and system for managing a computer infrastructure, it is understood that the invention further provides various alternative embodiments. For example, in one embodiment, the invention provides a program product stored on a computer-readable medium, which when executed, enables a computer infrastructure to manage a computer infrastructure. To this extent, the computer-readable medium includes program code, such as management component 30 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing system, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), on paper (e.g., capable of being scanned in as electronic data), and/or the like.

In another embodiment, the invention provides a method of generating a system for managing a computer infrastructure. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing system, such as computing system 14 (FIG. 1), from a computer-readable medium; (2) adding one or more computing systems to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as a solutions provider, could offer to manage a computer infrastructure as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing system having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a computer infrastructure, the method comprising:

obtaining a managed resource graph for the computer infrastructure, the managed resource graph including a set of resources and relationship data for the computer infrastructure, each resource comprising component of the computer infrastructure, the obtaining a managed resource graph including assigning each resource in the set of resources to one of a plurality of resource types, the plurality of resource types consisting of: a starting resource type, a transiting resource type, and a terminating resource type;

determining a set of related resources based on the managed resource graph and the corresponding resource types, the determining including:

selecting a first resource in the managed resource graph having the starting resource type; and traversing a set of branches in the managed resource graph from the first resource until each branch in the set of branches ends with a resource having the terminating resource type;

generating a related resource graph based on the set of related resources, the related resource graph comprising the set of related resources for the computer infrastructure and relationship data for the set of related resources;

obtaining a set of partition rules, the set of partition rules defining whether related resources in the related resource graph belong to the same recovery segment;

generating a set of tentative recovery segments based on the related resource graph and the set of partition rules;

obtaining a set of recovery segment templates, each recovery segment template in the set of recovery segment templates having a corresponding set of recovery characteristics that define requirements for managing the recovery segment template;

generating a set of recovery segments based on the set of tentative recovery segments and the set of recovery segment templates, the generating a set of recovery segments including mapping at least one of the set of tentative recovery segments to a corresponding at least one of the set of recovery segment templates, each recovery segment comprising a set of resources in computer infrastructure that operate as an entity;

assigning a set of recovery characteristics to each recovery segment in the set of recovery segments based on the set of tentative recovery segments; and storing the set of recovery segments and corresponding set of recovery characteristics for use in managing the computer infrastructure.

2. A system for managing a computer infrastructure, the system comprising:

at least one computing device including:

a system configured to obtain a managed resource graph for the computer infrastructure, the managed resource graph including a set of resources and relationship data for the computer infrastructure, each resource comprising component of the computer infrastructure, the obtaining a managed resource graph including assigning each resource in the set of resources to one of a plurality of resource types, the plurality of resource types consisting of: a starting resource type, a transiting resource type, and a terminating resource type;

a system configured to determine a set of related resources based on the managed resource graph and the corresponding resource types, the system configured to determine including:

a system configured to select a first resource in the managed resource graph having the starting resource type; and a system configured to traverse a set of branches in the managed resource graph from the first resource until each branch in the set of branches ends with a resource having the terminating resource type;

a system configured to generate a related resource graph based on the set of related resources, the related resource graph comprising the set of related resources for the computer infrastructure and relationship data for the set of related resources;

a system configured to obtain a set of partition rules, the set of partition rules defining whether related resources in the related resource graph belong to the same recovery segment;

a system configured to generate a set of tentative recovery segments based on the related resource graph and the set of partition rules;

a system configured to obtain a set of recovery segment templates, each recovery segment template in the set of recovery segment templates having a corresponding set of recovery characteristics that define requirements for managing the recovery segment template;

a system configured to generate a set of recovery segments based on the set of tentative recovery segments and the set of recovery segment templates, the generating a set of recovery segments including mapping at least one of the set of tentative recovery segments to a corresponding at least one of the set of recovery segment templates, each recovery segment comprising a set of resources in computer infrastructure that operate as an entity;

a system configured to assign a set of recovery characteristics to each recovery segment in the set of recovery segments based on the set of tentative recovery segments; and a system configured to store the set of recovery segments and corresponding set of recovery characteristics for use in managing the computer infrastructure.

3. A computer program stored on a physical computer-readable storage medium, which when executed, enables a computer system to manage a computer infrastructure, the computer program comprising program code for enabling the computer system to implement a method comprising:

obtaining a managed resource graph for the computer infrastructure, the managed resource graph including a set of resources and relationship data for the computer infrastructure, each resource comprising component of the computer infrastructure, the obtaining a managed resource graph including assigning each resource in the set of resources to one of a plurality of resource types, the plurality of resource types consisting of: a starting resource type, a transiting resource type, and a terminating resource type;

determining a set of related resources based on the managed resource graph and the corresponding resource types, the determining including:

selecting a first resource in the managed resource graph having the starting resource type; and traversing a set of branches in the managed resource graph from the first resource until each branch in the set of branches ends with a resource having the terminating resource type;

generating a related resource graph based on the set of related resources, the related resource graph comprising the set of related resources for the computer infrastructure and relationship data for the set of related resources;

obtaining a set of partition rules, the set of partition rules defining whether related resources in the related resource graph belong to the same recovery segment;

generating a set of tentative recovery segments based on the related resource graph and the set of partition rules;

obtaining a set of recovery segment templates, each recovery segment template in the set of recovery segment templates having a corresponding set of recovery characteristics that define requirements for managing the recovery segment template;

generating a set of recovery segments based on the set of tentative recovery segments and the set of recovery segment templates, the generating a set of recovery segments including mapping at least one of the set of tentative recovery segments to a corresponding at least one of the set of recovery segment templates, each recovery segment comprising a set of resources in computer infrastructure that operate as an entity;

assigning a set of recovery characteristics to each recovery segment in the set of recovery segments based on the set of tentative recovery segments; and storing the set of recovery segments and corresponding set of recovery characteristics for use in managing the computer infrastructure.

\* \* \* \* \*